United States Patent [19]
Chino et al.

[11] Patent Number: 4,746,542
[45] Date of Patent: May 24, 1988

[54] COATING METHOD FOR USE IN THE PRODUCTION OF MAGNETIC RECORDING MEDIUM

[75] Inventors: Naoyoshi Chino; Yasuhito Hiraki; Tsunehiko Sato, all of Kanagawa, Japan

[73] Assignee: Fuji Photo Film Co., Ltd., Kanagawa, Japan

[21] Appl. No.: 934,897

[22] Filed: Nov. 25, 1986

[30] Foreign Application Priority Data

Nov. 21, 1985 [JP] Japan ................. 60-262223

[51] Int. Cl.⁴ ............................................. H01F 10/02
[52] U.S. Cl. ................................... 427/131; 427/128; 427/172; 427/412.1; 427/434.3
[58] Field of Search .................. 427/127–132, 427/48, 172, 412.1, 434.3; 428/900, 694

[56] References Cited

U.S. PATENT DOCUMENTS 2,975,754  3/1961  Wright .................. 118/407

Primary Examiner—Bernard D. Pianalto
Attorney, Agent, or Firm—Sughrue, Mion, Zinn, Macpeak, and Seas

[57] ABSTRACT

A dual-coating method for use with a magnetic tape. A first coating solution is applied to a travelling support in an amount not exceeding 60 ml/m². Within 5 seconds, a extrusion head pressed against the unsupported but tensioned moving support applies a second coating solution in an amount not exceeding 50 ml/m².

6 Claims, 1 Drawing Sheet

COATING METHOD FOR USE IN THE PRODUCTION OF MAGNETIC RECORDING MEDIUM

BACKGROUND OF THE INVENTION

1. Field of the Invention

The present invention relates to a method of coating a plurality of layers successively on a travelling support. More particularly, the present invention relates to a method of multilayer coating suitable for use in the production of magnetic recording tape.

2. Background of the Invention

One of the recent trends in the area of magnetic recording is to use media, such as tape, that are thin and which yet are capable of high-density recording. In response to this need, the use of dual-layered magnetic coatings instead of single-layered systems is increasing. At the same time, the provision of primer coatings is common practice for the purpose of improving the adhesion between the support and the magnetic layer or back layer and this also calls for dual- or three-layered system. Presently, multi-layered coating is accomplished by repeating the coating and drying steps for individual layers. However, this method is not highly productive and requires high initial cost. It is therefore desired to develop a method that is capable of forming multiple layers in a single coating and drying zone. In this coating method which is hereunder referred to as a multiple coating method, it is at least required that the need to dry the coated layers one by one be eliminated.

The coating techniques currently employed in the production of magnetic recording media include roll coating, gravure coating, and a combination of roll coating or extrusion coating with doctor knife coating. However these methods obviously are incapable of forming multiple coatings because of the shearing force exerted during the coating operation.

Various proposals have been made with respect to the technique of extrusion coating but they all relate to the formation of single coatings. Techniques using a slide coater with slots has been proposed for providing multi-layered coatings in photographic materials. However, this method is not suitable for use in the manufacture of magnetic recording media because the coating solutions employed in their production are dispersions in organic solvents that are highly viscous, easy to agglomerate and dry, and are not adapted to high-speed coating.

SUMMARY OF THE INVENTION

An object, therefore, of the present invention is to provide a multiple coating method suitable for use in the production of a magnetic recording material that is capable of coating multiple layers at high speed within a single coating and drying zone, at least without the need to dry individual layers one by one, and which yet produces multi-layered coatings that are uniform and are free from such troubles as the pimple-like deformation caused by the agglomeration of suspended particles in the coating solution.

The present inventors made concerted efforts to attain the aforementioned object and have accomplished the present invention which relates to a coating method suitable for use in the production of a magnetic recording medium. In this coating method, a first coating solution is applied to a travelling support and, before the applied coating solution has dried up and without supporting the back surface of the support, a second coating solution is applied with the extrusion port of a second coating head being pressed against the surface to which the first coating solution has been applied. The method is characterized in that the first coating solution is applied in an amount of no more than 60 ml/m$^2$ while the second coating solution is applied in an amount of no more than 50 ml/m$^2$.

It is preferable for the purposes of the present invention that the second coating solution is applied no later than 5 seconds after the application of the first coating solution.

DETAILED DESCRIPTION OF THE INVENTION

The present invention is hereinafter described with particular reference being made to the accompanying drawings.

Figure 1:
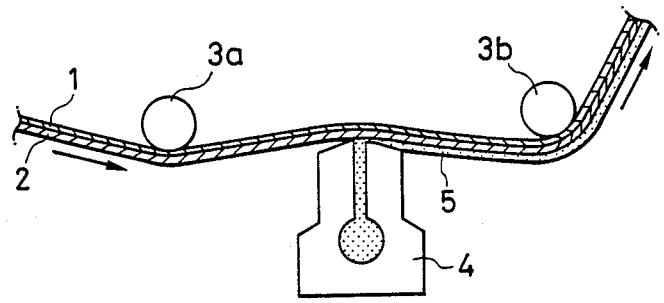
FIG. 1 is a sketch showing how the second coating is applied in accordance with one embodiment of the present invention.
Figure 2:
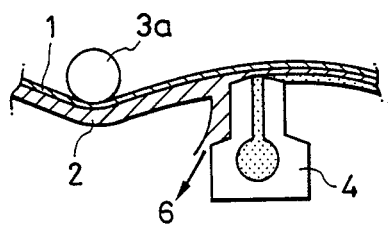
FIGS. 2 and 3 illustrate two cases where the head for coating the second layer is incapable of forming the desired coating.
Figure 3:
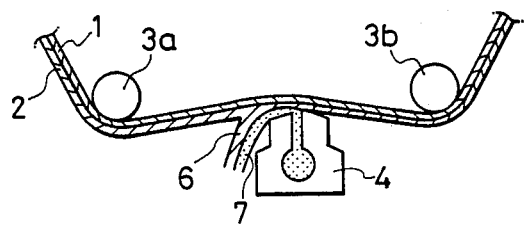

FIG. 1 is a sketch showing how the second coating is applied in accordance with one embodiment of the present invention. FIGS. 2 and 3 illustrate two cases where the head for coating the second layer is incapable of forming the desired coating. In each of these figures are shown a travelling support 1, in tape form a first layer 2 formed on the support 1 or a first coating solution 2 applied to that support 1. Backup rolls 3a and 3b support the support 1 which has been coated with the first coating solution 2. An extruder-type coating head 4 is positioned between the backup rolls 3a and 3b and has a slot for applying a second layer coating solution 5.

The system outlined above can suffer from the following problem during the coating of multiple layers. First of all, if the amount of the first coating solution 2 applied is excessive, a substantial portion 6 of the first coating solution is incapable of passing over the coating head 4 and is scraped off as shown in FIG. 2. The result is the same even if factors such as the configuration of the tip of the head 4 and the tension applied to the support 1 are altered. So long as the head 4 is pressed against the support 1, the first coating solution 2 applied in amounts exceeding 60 ml/m$^2$ will experience the aforementioned problem.

Secondly, if the amount of the second layer 5 formed or second coating solution applied is excessive, it will flow back as a backstream 7 from the coating head 4 together with the already applied excess first coating solution 6, as shown in FIG. 3. This phenomenon occurred in all cases where the amount of the second coating solution applied exceeded 50 ml/m$^2$.

In the interval between the applications of the first and second coating solutions is unduly long, the surface of the first coating 2 will harden and the resulting hard deposit on the tip of the second coating head 4 will cause such troubles as the formation of unwanted streaks. The appropriate interval between the applications of the two coating solutions depends on the solid content of the first coating solution and the type of organic solvent used. However, the experiments conducted by the present inventors demonstrated that satisfactory results were obtained in all cases where the interval from the application of the first coating solution 2 to that of the second coating solution 5 was no more than 5 second. This time interval is of course determined by the distance between the two coating stations and the speed of the support 1.

In the accompanying figures, the apparatus for coating the first layer is not shown but it may be formed by any of the known coating techniques such as roll coating, gravure coating, extrusion coating (as practiced with elements similar to the head 4 and the back up rollers 3a and 3b), slide head coating, curtain coating, and combinations thereof with doctor knife coating. Choice of an appropriate method depends on the properties of the first coating solution, the amount of its application and the application rate.

The second layer coating head 4 may be of any of the extruder-type heads that are shown in patent references such as Japanese Patent Application (OPI) Nos. 84771/1982, 104666/1983, 109162/1983, 94657/1984, 78664/1985 and 202075/1983 (the term OPI as used hereinafter means an unexamined pubished Japanese patent application).

The first coating solution 2 to be applied by the present invention may be of any of the coating solutions that are employed in the preparation of magnetic recording media and they include organic solvents, primer coating solutions formed of binders and organic solvents, dispersions of carbon black in binders, and dispersions of magnetic materials. The second coating solution 5 is not limited to any particular type either. Illustrative examples are over-coat forming solutions, dispersions of magnetic materials and back layer coating solutions. It is preferable but by no means essential that the solvent for the first coating solution is of the same composition as, or miscible with, the solvent for the second coating solution.

The following examples are provided for the purpose of further illustrating the present invention but are in no way to be taken as limiting.

EXAMPLE 1

Dual-layered coatings are formed on 15 micrometers thick polyethylene terephthalate base films at a rate of 200 m/min. The formulations of the first and second layer coating solutions are shown in Tables 1 and 3, respectively. The first coating solution was applied by roll coating or using a coating head of the type shown in Japanese Patent Application (OPI) No. 84771/1982. The coating weight of the first coating solution was varied as 5, 10, 30, 60 and 80 ml/m².

The second coating solution was applied in the manner shown in FIG. 1 using a coating head of the type shown in, for example, Japanese Patent Application (OPI) Nos. 84771/1982, 104666/1983 or 94657/1984. The coating weight of the second solution was varied as 5, 10, 30, 50 and 70 ml/m².

The time interval between the applications of the two coating solutions was set to 0.5 seconds. The tension applied to the support was within the range of 5-30 kg per meter of the width of support. The width of each coating on the support was 500 mm.

TABLE 1

| Formulation of the first coating solution by weight | |
|---|---|
| Carbon black (Sebalco MICT: average particle size, 250 micrometer) | 200 parts |
| Nipporan - 7304 (product of Nippon Polyurethane industry Co., Ltd.) | 80 parts |
| Phenoxy resin (PKH-1 of Union Carbide Corporation) | 35 parts |
| Copper oleate | 1 part |
| Methyl ethyl ketone | A parts |
| Cyclohexanone | 50 parts |

Three samples of the first coating solution, (a), (b) and (c), was prepared, with the value of A being properly changed. The viscosities and solids content of the respective samples are shown in Table 2.

TABLE 2

| | (a) | (b) | (c) |
|---|---|---|---|
| Solid content | 5% | 15% | 30% |
| Viscosity (P) at shear speed of the order of $10^1$ (sec.$^{-1}$) | 0.5 | 3 | 35 |
| Viscosity (P) at shear speed of the order of $1 \times 10^5$ (sec$^{-1}$) | 0.03 | 0.12 | 0.3 |

TABLE 3

| Formulation of the second coating solution (i.e., dispersion of magnetic material) by weight | |
|---|---|
| Co-containing iron oxide (with surface area of 35 m²/g as measured by the BET method) | 100 parts |
| Nitrocellulose | 10 parts |
| Polyurethane resin (Nipporan 2304 of Nippon Polyurethane Industry Co., Ltd.) | 8 parts |
| Polyisocyanate | 8 parts |
| Cr₂O₃ | 2 parts |
| Carbon black (average particle size, 20 micrometers) | 2 parts |
| Stearic acid | 1 part |
| Butyl stearate | 1 part |
| Methyl ethyl ketone | 300 parts |

The results of application of the first and second coating solutions are summarized in Table 4.

TABLE 4

| Formulation and coating weight of the first coating solution | | Coating weight of the second coating solution (ml/m²) | | | | |
|---|---|---|---|---|---|---|
| Sample | Coating weight (ml/m²) | 5 | 10 | 30 | 50 | 60 |
| (a) | 5 | O | O | O | O | *-2 |
| (a) | 10 | O | O | O | O | *-2 |
| (a) | 30 | O | O | O | O | *-2 |
| (a) | 60 | O | O | O | O | *-2 |
| (a) | 80 | *-1 | *-1 | *-1 | *-1 | — |
| (b) | 5 | O | O | O | O | *-2 |
| (b) | 10 | O | O | O | O | *-2 |
| (b) | 30 | O | O | O | O | *-2 |
| (b) | 60 | O | O | O | O | *-2 |
| (b) | 80 | *-1 | *-1 | *-1 | *-1 | — |
| (c) | 5 | O | O | O | O | *-2 |
| (c) | 10 | O | O | O | O | *-2 |
| (c) | 30 | O | O | O | O | *-2 |
| (c) | 60 | O | O | O | O | *-2 |
| (c) | 80 | *-1 | *-1 | *-1 | *-1 | — |

Notes:
"O", both the first and second coating solutions could be applied to provide coatings of good surface quality;
"*-1", coating was impossible because of the difficulty illustrated in FIG. 2;
"*-2", coating was impossible because of the difficulty illustrated in FIG. 3.

Irrespective of the viscosity of the first coating solution, satisfactory coating could not be achieved when the coating weight of the first solution was 80 ml/m² or more, or when the coating weight of the second solution was 60 ml/m² or more.

EXAMPLE 2

The procedures of Example 1 were repeated except that the thickness of the polyethylene terephthalate base films was increased to 75 micrometers and that sample (b) was used as the first coating solution. The results were the same as those shown for sample (b) of Table 4.

EXAMPLE 3

Coating tests were conducted with the interval between the applications of the first and second coating solutions being varied as shown in Table 5. Two samples, (a) and (c), of the first coating solution were used. The interval between the applications of the first and second solutions was varied by adjusting the distance between the first and second coating heads. The first coating solution was applied in a weight of 20 ml/m$^2$ and the second coating solution in a weight of 10 ml/m$^2$. In all the tests, a polyethylene terephthalate film of 75 micrometers thickness was used as the support and coated with the first and second coating solutions at a rate of 100 m/min.

The results are shown in Table 5.

TABLE 5

| Interval (sec) between the applications of the first and second coating solutions | 0.5 | 1 | 3 | 5 | 6 |
|---|---|---|---|---|---|
| Quality of the coated surface | (1) | (1) | (1) | (2) | (3) |

Notes:
"(1)", good;
"(2)", a few streaks occurred;
"(3)", extensive formation of deep streaks When the second coating solution was applied 6 seconds after the first solution, many deep streaks developed on the surface of the second coating. This was because the hardened surface of the first layer had been deposited on the second coating head 4 in FIG. 1. It is therefore preferable for the purposes of the present invention that the second coating solution is applied within 5 seconds after the application of the first solution.

EXAMPLE 4

The procedure of Example 1 were repeated except that a solution having the formulation shown in Table 6 below was used as the first coating solution.

TABLE 6

| Methyl ethyl ketone | 100 parts |
|---|---|
| Toluene | 100 parts |
| Nitrocellulose | 5 parts |

When the coating weight of the first solution exceeded 60 ml/m$^2$, it was impossible to achieve the desired coating because of the difficulty illustrated in FIG. 2. When the coating weight of the second solution exceeded 50 ml/m$^2$, it was also impossible to achieve the intended coating because of the difficulty depicted in FIG. 3.

As discussed in the foregoing, the success of the multiple coating method of the present invention is not dependent on the formulation of either the first or second coating solution so long as the first coating solution is applied in an amount of 60 ml/m$^2$ or less and the second coating solution in an amount of 50 ml/m$^2$ or less. A second coating of particularly good quality is attainable if it is applied within 5 seconds after the application of the first coating. Therefore, in accordance with the present invention, multi-layered coatings can be formed within a single coating zone, and a substantial cost reduction can be achieved in the manufacture of magnetic recording media.

What is claimed is:

1. A coating method for use in producing a magnetic recording medium, comprising the steps of
   moving an elongated support;
   applying a first coating solution to a first surface of said moving support in an amount of no more than 60 milliliter/m$^2$; and
   before said first coating solution has dried, applying a second coating solution to a surface of said first coating solution with an extrusion head pressed against said surface of said first coating solution and a second surface of said support opposed to said first surface not being supported at said extrusion head, said second coating solution being applied in an amount not exceeding 50 milliliter/m$^2$.

2. A coating method as recited in claim 1, wherein said second coating solution is applied no later than 5 seconds after said first coating solution is applied.

3. A coating method as recited in claim 2, wherein said first coating solution comprises any one of coating solutions employed in the preparation of magnetic recording media, said coating solutions being selected from the group comprising organic solvents, primer coating solutions formed of binders and organic solvents, dispersions of carbon black in binders, and dispersions of magnetic materials.

4. A coating method as recited in claim 2, wherein said second coating solution comprises any one of overcoat forming solutions, dispersions of magnetic materials and back layer coating solutions.

5. A coating method as recited in claim 2, wherein a solvent of said second coating solution is miscible with a solvent of said first coating solution.

6. A coating method as recited in claim 1, wherein said step of applying said second coating solution includes tensioning said moving support against said extrusion head in an amount of 5-30 kg per meter of a width of said moving support.

* * * * *